United States Patent
Fujino

(10) Patent No.: US 8,914,488 B2
(45) Date of Patent: Dec. 16, 2014

(54) METHOD AND SYSTEM FOR MONITORING A MONITORING-TARGET PROCESS

(75) Inventor: Junichi Fujino, Tokyo (JP)

(73) Assignee: International Business Machines Corporation, Armonk, NY (US)

(*) Notice: Subject to any disclaimer, the term of this patent is extended or adjusted under 35 U.S.C. 154(b) by 185 days.

(21) Appl. No.: 13/419,971

(22) Filed: Mar. 14, 2012

(65) Prior Publication Data

US 2012/0278478 A1 Nov. 1, 2012

(30) Foreign Application Priority Data

Apr. 28, 2011 (JP) ................................ 2011-102129

(51) Int. Cl.
*G06F 15/173* (2006.01)
*H04L 29/06* (2006.01)
*G06F 11/30* (2006.01)
*G06F 11/07* (2006.01)

(52) U.S. Cl.
CPC .......... *G06F 11/3055* (2013.01); *H04L 65/403* (2013.01); *G06F 11/0793* (2013.01); *G06F 11/0709* (2013.01); *G06F 11/3017* (2013.01); *G06F 11/0775* (2013.01); *G06F 11/0748* (2013.01); *G06F 11/3006* (2013.01); *G06F 11/0715* (2013.01)
USPC .......................................... 709/223; 709/224

(58) Field of Classification Search
CPC ..................................................... H04L 65/403
USPC ................................................. 709/223, 224
See application file for complete search history.

(56) References Cited

U.S. PATENT DOCUMENTS

| | | | | |
|---|---|---|---|---|
| 6,324,577 B1 * | 11/2001 | Hirai | ............................. | 709/223 |
| 7,328,127 B2 * | 2/2008 | Otsuka et al. | ................. | 702/182 |
| 8,316,248 B2 * | 11/2012 | Yokota et al. | ................. | 713/310 |
| 8,495,192 B2 * | 7/2013 | Maegawa et al. | ............ | 709/223 |
| 2003/0009511 A1 * | 1/2003 | Giotta et al. | ................... | 709/201 |
| 2005/0114528 A1 * | 5/2005 | Suito | ............................. | 709/228 |
| 2007/0124427 A1 * | 5/2007 | Light et al. | ..................... | 709/218 |
| 2010/0023612 A1 * | 1/2010 | Yoshida et al. | ............... | 709/223 |
| 2010/0070627 A1 * | 3/2010 | Miyazaki et al. | ............ | 709/224 |
| 2011/0022707 A1 * | 1/2011 | Bansal et al. | ................. | 709/224 |
| 2011/0145383 A1 * | 6/2011 | Bishop et al. | ................. | 709/223 |

FOREIGN PATENT DOCUMENTS

| | | |
|---|---|---|
| JP | 0612288 A | 6/1992 |
| JP | 05257757 A | 10/1993 |
| JP | 11031136 | 2/1999 |
| JP | 2001117789 | 4/2001 |

(Continued)

OTHER PUBLICATIONS

JPO Office Action Jun. 24, 2014, 2 pages.

*Primary Examiner* — Moustafa M Meky
*Assistant Examiner* — Uzma Alam
(74) *Attorney, Agent, or Firm* — Schmeiser, Olsen & Watts, LLP; John Pivnichny

(57) ABSTRACT

A method and system for monitoring a monitoring-target process. A monitored server computer starts a monitoring-target process. After starting the monitoring-target process, the computer ascertains a current operating state of the monitoring-target process which includes utilizing a monitoring condition record included in a monitoring-condition registry. The monitoring-condition registry is a file or database stored in a data storage device in the computer. The monitoring condition record includes monitoring conditions controlling implementation of the monitoring-target process. The monitoring condition record includes a process label that uniquely identifies the monitoring-target process. After ascertaining the current operating state, the computer stops the monitoring-target process.

18 Claims, 8 Drawing Sheets

(56) References Cited

FOREIGN PATENT DOCUMENTS

| | | |
|---|---|---|
| JP | 2003070081 | 3/2003 |
| JP | 2005099976 | 4/2005 |
| JP | 2005251048 | 9/2005 |
| JP | 2006344025 A | 12/2006 |
| JP | 2008217464 | 3/2007 |
| JP | 2007249739 | 9/2007 |
| JP | 2007323560 | 12/2007 |
| JP | 2009282601 | 5/2008 |
| JP | 2009199213 A | 9/2009 |
| JP | 2009251890 A | 10/2009 |
| JP | 2010211319 A | 9/2010 |
| JP | 2010278936 | 12/2010 |

* cited by examiner

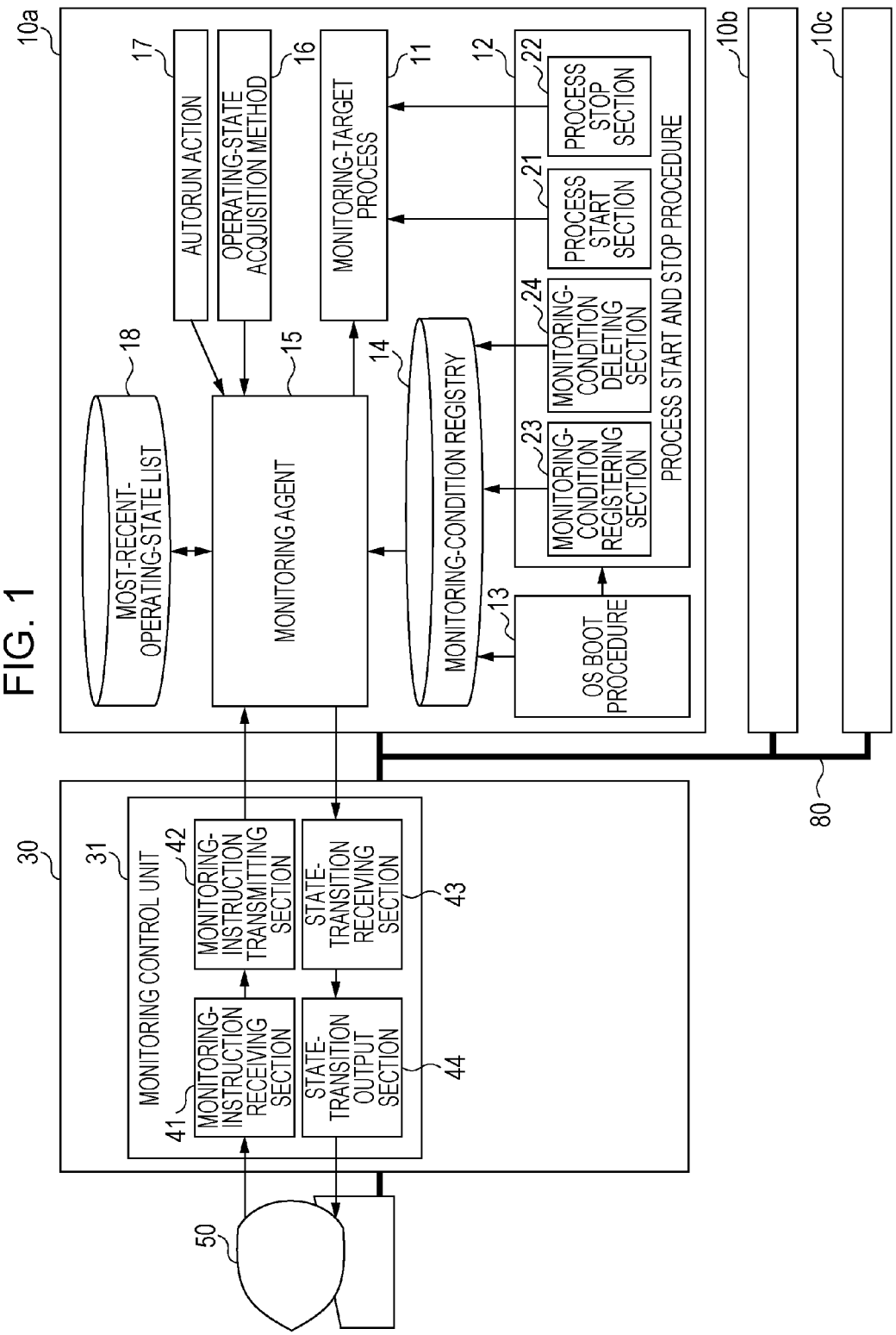

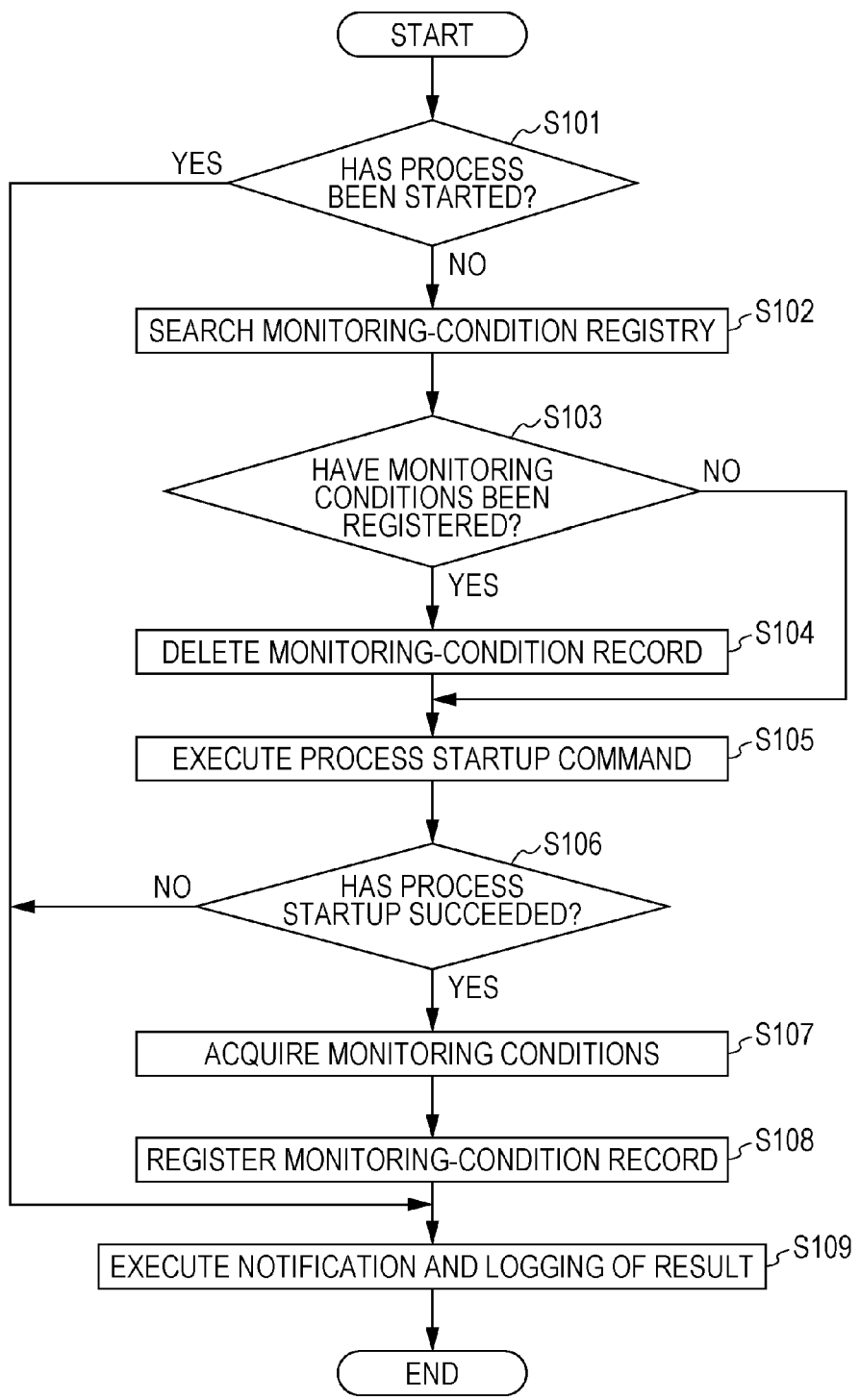

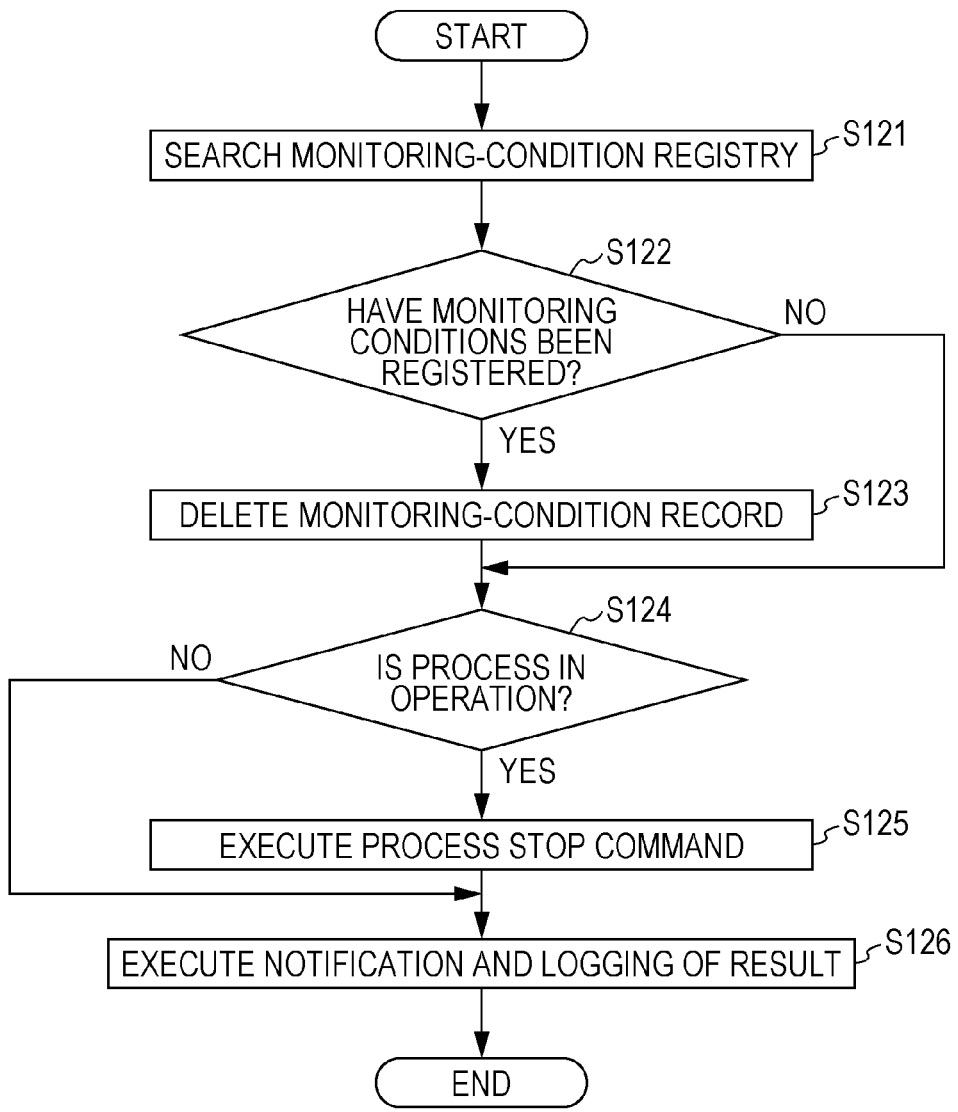

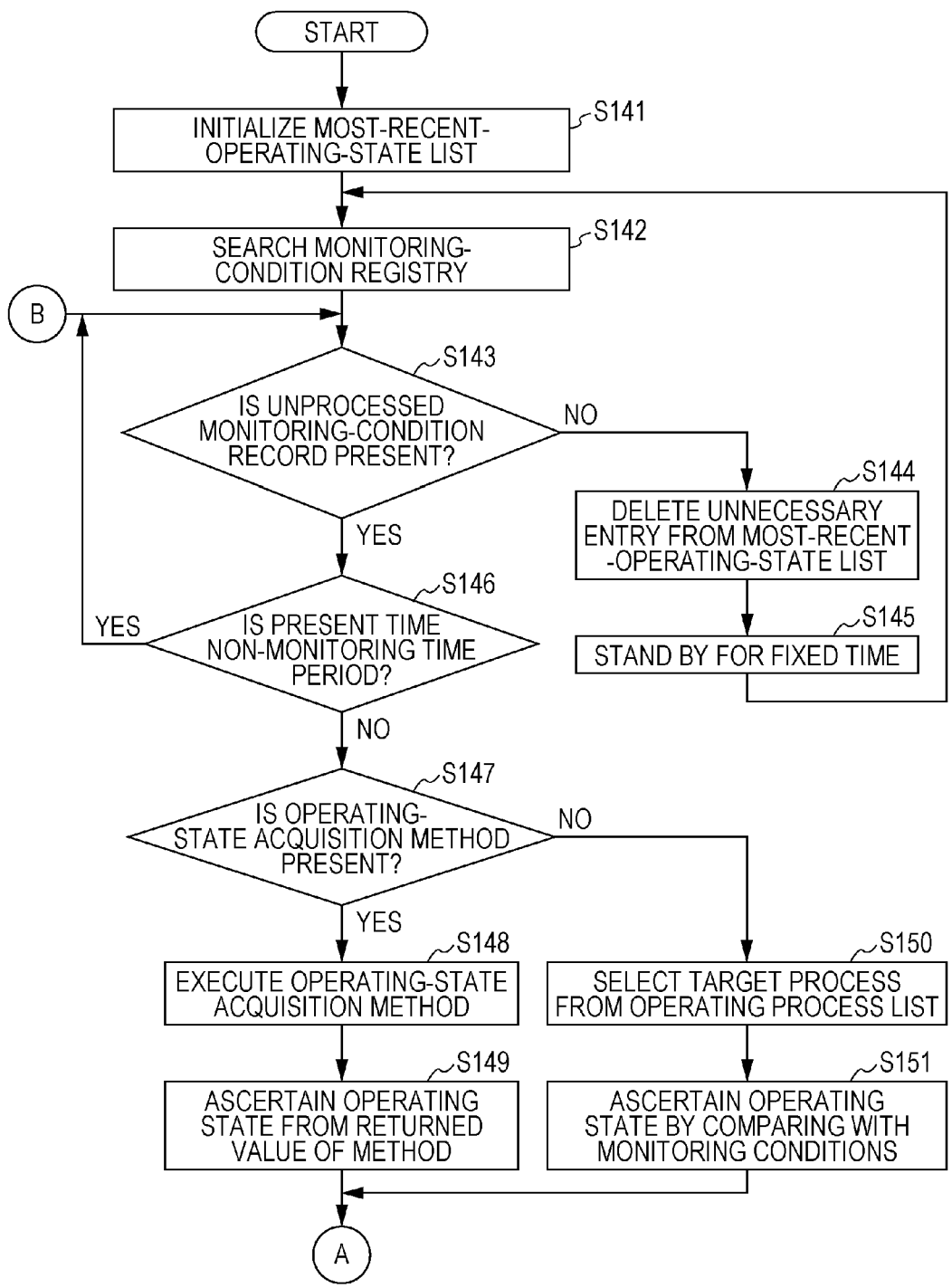

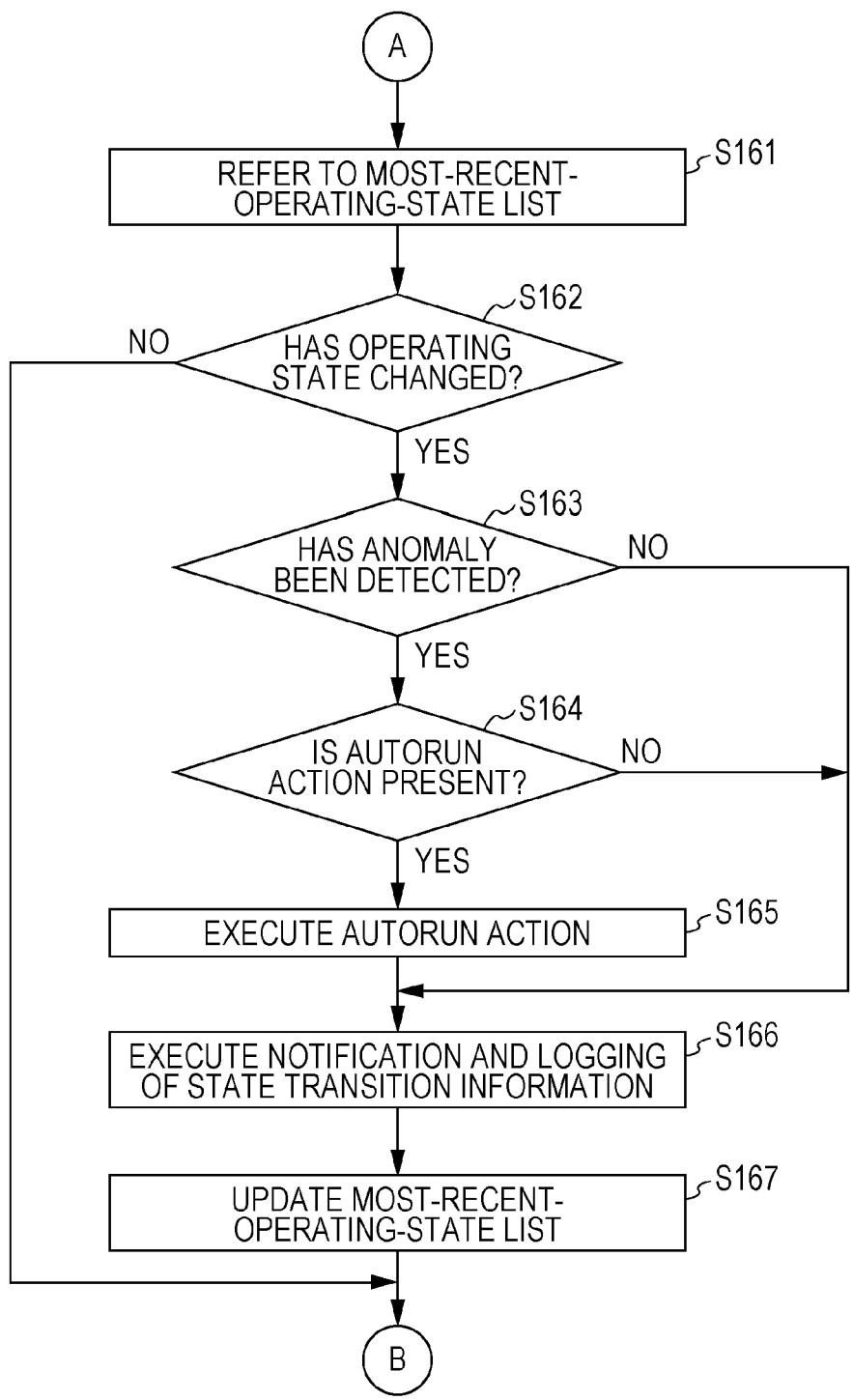

FIG. 6

| PROCESS LABEL (KEY) | PROCESS NAME | PROCESS USER NAME | UPPER LIMIT OF NUMBER OF PROCESS INSTANCES | LOWER LIMIT OF NUMBER OF PROCESS INSTANCES | OPERATING-STATE ACQUISITION METHOD | AUTORUN ACTION | NOTIFICATION EVENT SPECIFICATION | NON-MONITORING TIME PERIOD SCHEDULE |
|---|---|---|---|---|---|---|---|---|
| RDBMS | - | - | - | - | /sbin/rdbms status | /sbin/rdbms restart | Severity=FATAL msg="DB Down : call 012-3334" | - |
| WebServer | httpd | - | 100 | 20 | - | Send_mail.sh WebServer | Severity=CRITICAL msg="WebServer Down" | - |
| APPL | program_A | userA | 1 | 1 | - | - | - | Sunday 22:00-23:00 |

US 8,914,488 B2

METHOD AND SYSTEM FOR MONITORING A MONITORING-TARGET PROCESS

TECHNICAL FIELD

The present invention relates to an apparatus and method for executing a monitoring-target process in one of a plurality of apparatuses monitored by a monitoring apparatus.

BACKGROUND

To monitor the availability of a distributed server system, the operating states of processes operating on individual servers are monitored.

The operation of defining setting information indicating the details of operation for monitoring (hereinafter referred to as "monitoring setting information") is complicated.

In an environment in which the number of apparatuses monitored by a monitoring apparatus is large and an environment in which monitored processes in operation in monitored apparatuses (hereinafter referred to as "monitoring-target processes") vary from one monitored apparatus to another, in particular, when the individual monitored apparatuses take charge of a plurality of sections, checking, documenting, and defining all monitoring setting information completely, and continuing to maintain and reflect the information exert a heavy work load and difficulty on a person at the monitoring apparatus side in charge of integrated monitoring of the monitored apparatuses. Furthermore, this forces also a person at the monitored apparatus side to perform frequent coordination and connection with the person at the monitoring apparatus side. That is, this increases the number of person hours and loads on both the person at the monitoring apparatus side and the person at the monitored apparatus side, resulting in omission and detection error in monitoring.

It is difficult to synchronize a service life cycle and a monitoring-setting-information changing operation.

As a service provided by a monitored apparatus is added, changed, and deleted, data and a process in the monitored apparatus, which directly support the service, are also changed as a matter of course. At that time, if the process is to be monitored, the monitoring apparatus that executes integrated monitoring needs to perform the operation of changing the monitoring setting information and the operation of updating a document related to the monitoring. These operations are required for every addition, change, and deletion of a service. If these operations are repeated, the load of the operation maintenance work increases. If the change timing differs between the monitored apparatus side and the monitoring apparatus side, omission and detection error in monitoring will occur.

Information for use in acquiring the operating state of a monitoring-target process is fixed.

Optimum information for use in acquiring the operating state, for example, an optimum method for use in acquiring the operating state, sometimes differs depending on the monitoring-target process. An example is a case where a dedicated command for checking the operating state of a specific middleware process is provided, and higher monitoring accuracy may be provided by using the dedicated command. However, because the known monitoring methods cannot change the operating-state acquisition method depending on the monitoring-target process, it is necessary to add a separate monitoring function to use the dedicated command. Furthermore, the known monitoring methods cannot change the operation to be executed and notification information depending on the monitoring-target process when anomaly of the operating state is detected.

BRIEF SUMMARY

The present invention provides a method for monitoring a monitoring-target process, said method comprising:

a monitored server computer starting a monitoring-target process;

after said starting the monitoring-target process, said computer ascertaining a current operating state of the monitoring-target process, said ascertaining comprising utilizing a monitoring condition record included in a monitoring-condition registry, said monitoring-condition registry being a file or database stored in a data storage device in the computer, said monitoring condition record including monitoring conditions controlling implementation of the monitoring-target process, said monitoring condition record comprising a process label that uniquely identifies the monitoring-target process; and after said ascertaining the current operating state, said computer stopping the monitoring-target process.

The present invention provides a computer program product comprising a computer readable hardware storage device storing program code configured to be executed by a monitored server computer to implement a method for monitoring a monitoring-target process, said method comprising:

said computer starting a monitoring-target process;

after said starting the monitoring-target process, said computer ascertaining a current operating state of the monitoring-target process, said ascertaining comprising utilizing a monitoring condition record included in a monitoring-condition registry, said monitoring-condition registry being a file or database stored in a data storage device in the computer, said monitoring condition record including monitoring conditions controlling implementation of the monitoring-target process, said monitoring condition record comprising a process label that uniquely identifies the monitoring-target process; and after said ascertaining the current operating state, said computer stopping the monitoring-target process.

The present invention provides a system comprising a monitored server computer and a computer readable hardware storage device, said storage device stores program code configured to be executed by the computer to implement a method for monitoring a monitoring-target process, said method comprising:

said computer starting a monitoring-target process;

after said starting the monitoring-target process, said computer ascertaining a current operating state of the monitoring-target process, said ascertaining comprising utilizing a monitoring condition record included in a monitoring-condition registry, said monitoring-condition registry being a file or database stored in a data storage device in the computer, said monitoring condition record including monitoring conditions controlling implementation of the monitoring-target process, said monitoring condition record comprising a process label that uniquely identifies the monitoring-target process; and after said ascertaining the current operating state, said computer stopping the monitoring-target process.

BRIEF DESCRIPTION

FIG. 1 is a block diagram showing a configuration example of a monitoring system of a first embodiment of the present invention.

FIG. 2 is a flowchart showing an example of operation when a process start and stop procedure starts a monitoring-target process in the first embodiment of the present invention.

FIG. 3 is a flowchart showing an example of operation when the process start and stop procedure stops a monitoring-target process in the first embodiment of the present invention.

FIG. 4 is a flowchart showing an example of the operation of a monitoring agent in the first embodiment of the present invention.

FIG. 5 is a flowchart showing an example of the operation of the monitoring agent in the first embodiment of the present invention.

FIG. 6 is a diagram showing an example of monitoring-condition records registered in a monitoring-condition registry in the first embodiment of the present invention.

DETAILED DESCRIPTION OF THE INVENTION

Figure 7:
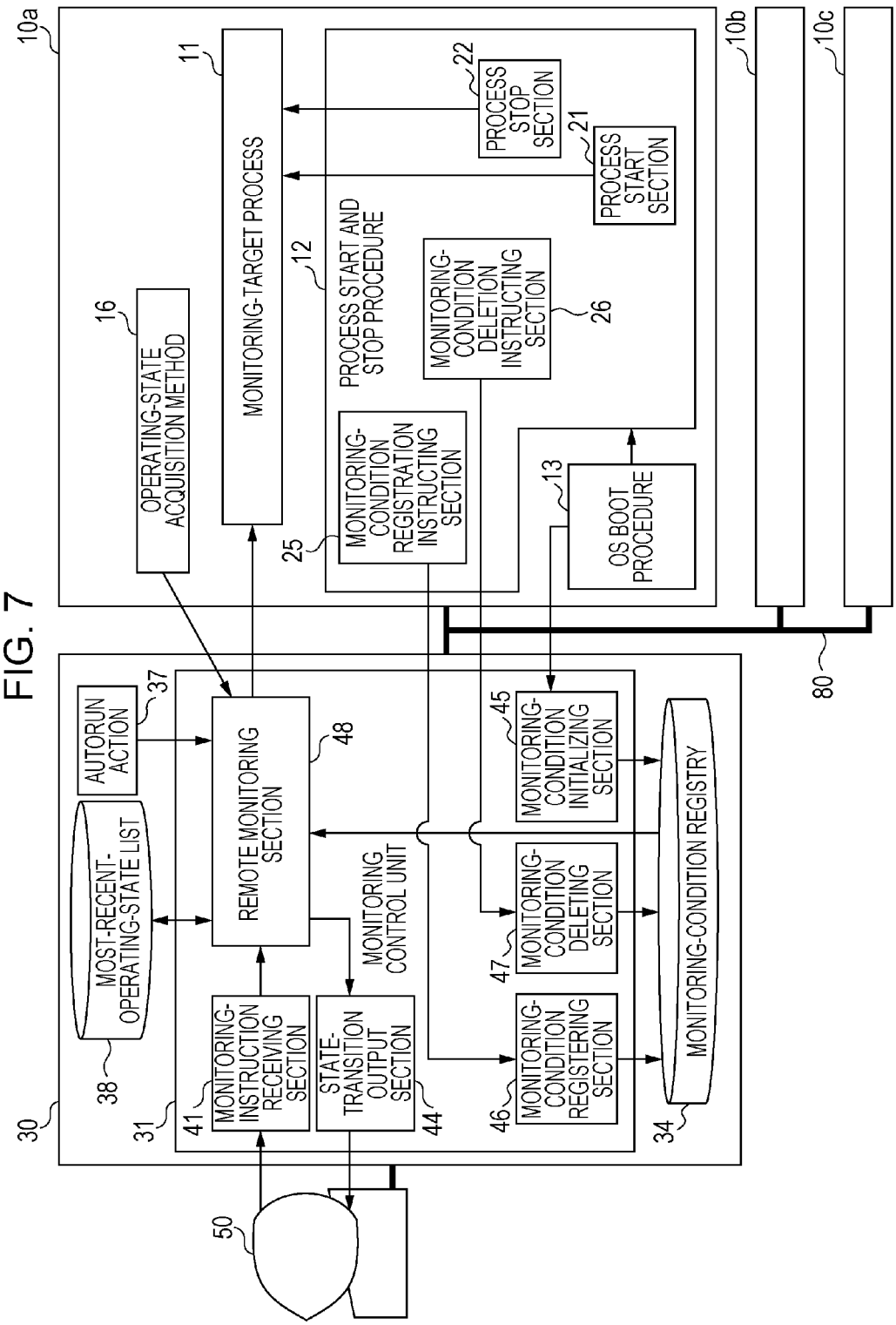
FIG. 7 is a block diagram showing a configuration example of a monitoring system of a second embodiment of the present invention.

Embodiments of the present invention will be described in detail below with reference to the attached drawings.

The present invention eliminates the need for the operation, at the monitoring apparatus side, of registering monitoring setting information on a monitoring-target process executed by the monitored apparatus.

The present invention eliminates the need for the operation, at the monitoring apparatus side, of changing monitoring setting information on a monitoring-target process executed by the monitored apparatus when the monitoring setting information is changed.

The present invention allows information for use in acquiring the operating state of the monitoring-target processes or operation to be executed and a description to be notified when anomaly of the operating state of the monitoring-target processes is detected to be defined or changed freely for individual monitoring-target processes at the monitored apparatus side.

The present invention provides an apparatus executing a monitoring-target process in one of a plurality of monitored apparatuses monitored by a monitoring apparatus, the apparatus including a process start section configured to start the monitoring-target process; a registering section configured to register monitoring setting information in a format common to the plurality of monitored apparatuses after the monitoring-target process is started by the process start section, the information indicating the description of operation for monitoring the monitoring-target process and being set by the one monitored apparatus, the description being referred to during the monitoring; a process stop section configured to stop the monitoring-target process; and a deleting section configured to delete, before the monitoring-target process is stopped by the process stop section, the monitoring setting information registered by the registering section.

In the apparatus, the monitoring setting information may include information used to acquire the operating state of the monitoring-target process, information indicating operation to be executed when anomaly of the operating state of the monitoring-target process is detected, and information indicating a description to be notified when anomaly of the operating state of the monitoring-target process is detected.

In the apparatus, the registering section may register the monitoring setting information in a storage section in the one monitored apparatus, the monitoring setting information being referred to by a monitoring agent configured to monitor the monitoring-target process by operating in the one monitored apparatus under the control of the monitoring apparatus, or may register the monitoring setting information in a storage section in the monitoring apparatus by transmitting the monitoring setting information to the monitoring apparatus.

The present invention further provides a system including a monitoring apparatus that monitors a plurality of monitored apparatuses and a monitored apparatus that is one of the monitored apparatuses, the monitored apparatus executing a monitoring-target process to be monitored by the monitoring apparatus, wherein the monitored apparatus includes a process start section configured to start the monitoring-target process; a registering section configured to register monitoring setting information in a storage section in the monitored apparatus in a format common to the plurality of monitored apparatuses after the monitoring-target process is started by the process start section, the information indicating the description of operation for monitoring the monitoring-target process and being set by the monitored apparatus; a process stop section configured to stop the monitoring-target process; a deleting section configured to delete the monitoring setting information from the storage section before the monitoring-target process is stopped by the process stop section; and a monitoring-agent executing section configured to execute a monitoring agent that monitors the monitoring-target process with reference to the monitoring setting information registered in the storage section, and wherein the monitoring apparatus includes a receiving section configured to receive an instruction to monitor the monitoring-target process; a control unit configured to control execution of the monitoring agent by the monitoring-agent executing section in response to reception of the instruction by the receiving section; an acquisition section configured to acquire the result of monitoring by the monitoring agent from the monitoring-agent executing section; and an output section configured to output the result acquired by the acquisition section.

The present invention further provides a system including a monitoring apparatus that monitors a plurality of monitored apparatuses and a monitored apparatus that is one of the monitored apparatuses, the monitored apparatus executing a monitoring-target process to be monitored by the monitoring apparatus, wherein the monitored apparatus includes a process start section configured to start the monitoring-target process; a registration-instruction transmitting section configured to transmit an instruction to register monitoring setting information to the monitoring apparatus after the monitoring-target process is started by the process start section, the information indicating the description of operation for monitoring the monitoring-target process and being set by the monitored apparatus; a process stop section configured to stop the monitoring-target process; and a deletion-instruction transmitting section configured, before the monitoring-target process is stopped by the process stop section, to transmit an instruction to delete the monitoring setting information to the monitoring apparatus, the monitoring setting information being registered according to the registration instruction from the registration-instruction transmitting section, and wherein the monitoring apparatus includes a registering section configured to register the monitoring setting information in a storage section in the monitoring apparatus in a format common to the plurality of monitored apparatuses in accordance with the instruction transmitted from the registration-instruction transmitting section; a deleting section configured to delete the monitoring setting information from the storage section in accordance with the instruction transmitted by the deletion-instruction transmitting section; a receiving section configured to receive an instruction to monitor the monitoring-target process; a monitoring section configured to monitor the monitoring-target process, in response to the reception of the instruction by the receiving section, with reference to the monitoring setting information registered in the storage section; and an output section configured to output the result of monitoring by the monitoring section.

The present invention further provides a method for executing a monitoring-target process in one of a plurality of monitored apparatuses monitored by a monitoring apparatus, the method including the steps of starting the monitoring-target process; registering monitoring setting information in a format common to the plurality of monitored apparatuses after the monitoring-target process is started, the information indicating the description of operation for monitoring the monitoring-target process and being set by the one monitored apparatus, the description being referred to during the monitoring; deleting the registered monitoring setting information; and stopping the monitoring-target process after the monitoring setting information is deleted.

The present invention further provides a computer program product comprising a computer readable hardware storage medium or device storing program code configured to be executed by a computer (e.g., the monitoring server computer 30 and/or the monitored server computers 10 in FIG. 1) to perform the methods of the present invention. The hardware medium or device is a physically tangible medium or device. Such methods include a method in which an apparatus executes a monitoring-target process in one of a plurality of monitored apparatuses monitored by a monitoring apparatus to execute steps including starting the monitoring-target process; registering monitoring setting information in a format common to the plurality of monitored apparatuses after the monitoring-target process is started, the information indicating the description of operation for monitoring the monitoring-target process and being set by the one monitored apparatus, the description being referred to during the monitoring; stopping the monitoring-target process; and deleting, before the monitoring-target process is stopped by the process stop section, the monitoring setting information registered by the registering section.

The present invention eliminate the need for the operation, at a monitoring server side, of registering monitoring setting information on a monitoring-target process executed by a monitored server.

FIG. 1 is a block diagram showing a configuration example of a monitoring system of a first embodiment of the present invention.

As shown in FIG. 1, the monitoring system includes monitored servers 10a, 10b, and 10c and a monitoring server 30 connected together via a network 80. The monitoring server 30 connects to a monitoring console 50. Although FIG. 1 shows the monitored servers 10a, 10b, and 10c, they are also referred to as monitored servers 10 when there is no need to differentiate them from one another. Although FIG. 1 shows three monitored servers 10, the number of monitored servers 10 is not limited thereto, for example, it may be two or four or more.

The monitored servers 10 are server computers to be monitored by the monitoring server 30 and are an example of a monitored apparatus. The monitored servers 10 each include a monitoring-target process 11, a process start and stop procedure 12, an OS boot procedure 13, a monitoring-condition registry 14, a monitoring agent 15, an operating-state acquisition method 16, an autorun action 17, and a most-recent-operating-state list 18.

The monitoring-target process 11 is a process whose operating state is monitored by the monitoring server 30.

The process start and stop procedure 12 is a procedure for controlling the start-up and stop of the monitoring-target process 11. The process start and stop procedure 12 writes a monitoring-condition record including conditions for monitoring the monitoring-target process 11 when starting the monitoring-target process 11 (hereinafter referred to as "monitoring conditions") into the monitoring-condition registry 14 and deletes the monitoring-condition record including the monitoring conditions from the monitoring-condition registry 14 when stopping the monitoring-target process 11. The monitoring conditions control implementation of the monitoring-target process 11. By executing the process start and stop procedure 12, the monitored server 10 implements a process start section 21 that starts the monitoring-target process 11, a process stop section 22 that stops the monitoring-target process 11, a monitoring-condition registering section 23 which is an example of a registering section that registers a monitoring-condition record in the monitoring-condition registry 14, and a monitoring-condition deleting section 24 which is an example of a deleting section that deletes the monitoring-condition record from the monitoring-condition registry 14.

The OS boot procedure 13 is a procedure for starting the operating system (OS) of the monitored server 10. The OS boot procedure 13 initializes the monitoring-condition registry 14 when starting the OS, that is, before the process of starting the monitoring agent 15 and all the monitoring-target processes 11. However, of the monitoring-condition records written to the monitoring-condition registry 14, statistically defined monitoring-condition records other than monitoring-condition records that are dynamically registered by the process start and stop procedure 12 are not initialized. The OS boot procedure 13 sometimes implements the process start and stop procedure 12 when starting the OS.

The monitoring-condition registry 14 is a file or a database stored in a data storage device in the monitored computer 10 and is an example of a storage section that stores monitoring-condition records. The monitoring-condition records include monitoring conditions which are examples of monitoring setting information, such as a process label, a process name, a process user name, a process ID, a parent process ID, an upper limit of the number of process instances, a lower limit of the number of process instances, an operating-state acquisition method, an autorun action, a notification event specification, and a non-monitoring time period schedule.

The process label is a unique name that is given to each of the process start and stop procedures 12 in the monitored servers 10 and is an item serving as a record key of the monitoring-condition record.

The process name is a name identifying an operating program that is actually operating while the monitoring-target process 11 is being implemented and includes a path name and an argument.

The process user name is the name of a user who triggers execution of the operating program identified by the process name. The user name may include all information that identifies the user.

The process ID is an identifier that identifies an assigned process at the start of the monitoring-target process. The parent process ID is an identifier that identifies an assigned parent process of the assigned process at the start of the parent process.

The upper limit of the number of process instances is the maximum number of process instances of the monitoring-target process 11 that can be executed at the same time (i.e., simultaneously). The lower limit of the number of process instances is the minimum number of process instances of the monitoring-target process 11 that can be executed at the same time.

The operating-state acquisition method is a command or the like that is used to acquire the current operating state of the monitoring-target process 11. Thus, a returned value resulting from execution of the operating-state acquisition is the current operating state of the monitoring-target process 11. It may be anything other than the command or the like provided that it is used to acquire the operating state of the process. A description will be made below using the command or the like.

The autorun action is an action or procedure that is to be automatically executed by the monitoring agent 15 when an anomaly of the process operating state is detected. Examples include rebooting the process and notification of anomaly detection. The notification event specification is a description to be notified by the monitoring agent 15 when anomaly in the process operating state is detected. Examples include event severity and message text. The notification event specification specifies a severity of an abnormal operating state of the monitoring-target process.

The non-monitoring time period schedule is schedule information indicating a time period during which the monitoring agent 15 is not allowed to execute process monitoring. In the case of a monitoring-target process in which a monitoring-condition record cannot be dynamically written from the process start and stop procedure 12, the monitoring-condition record can be statistically registered in the monitoring-condition registry 14, and thus, control of monitoring and non-monitoring based on the statistically registered monitoring-condition record is performed according to the non-monitoring time period schedule.

The monitoring agent 15 is an agent program which is introduced from the monitoring server 30 and whose operation is managed and controlled by the monitoring server 30. The monitoring agent 15 determines the monitoring-target process 11 in accordance with monitoring conditions stored in the monitoring-condition registry 14 and monitors the operating state in a fixed cycle. At that time, the operating state of a process in which an operating-state acquisition method is defined is monitored using the method, while the operating state of a process in which no operating-state acquisition method is defined is monitored using a default command or an application program interface (API). The monitoring agent 15 compares the operating state detected by the monitoring and an operating state in the most-recent-operating-state list 18 to determine whether the state has changed from the most-recent monitoring cycle. When state transition is detected, the monitoring agent 15 reflects it to the most-recent-operating-state list 18 and notifies the monitoring server 30 of the state transition. At that time, if an autorun action at anomaly detection is defined in the monitoring-condition registry 14, the monitoring agent 15 executes the autorun action. If the description and format of an event to be notified as a notification event specification are defined in the monitoring-condition registry 14, the monitoring agent 15 provides notification according to them. The monitoring agent 15 is executed by a program executing section (not shown) as an example of a monitoring-agent executing section.

Figure 8:
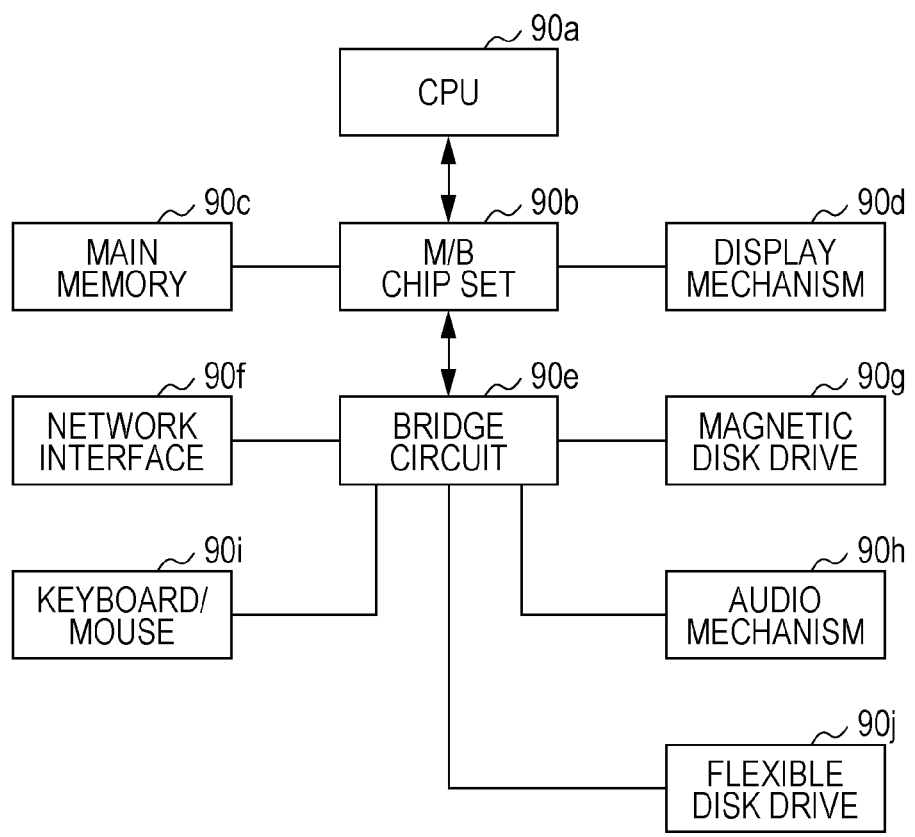
FIG. 8 is a diagram showing an example of the hardware configuration of a computer to which the embodiments of the present invention can be applied.

The operating-state acquisition method 16 is data, such as a command, for use in acquiring a process operating state, and is stored in, for example, a magnetic disk drive 90g (see FIG. 8).

The autorun action 17 is data, such as commands for rebooting the process and providing a fault notification (e.g., by email), which is stored in, for example, the magnetic disk drive 90g (see FIG. 8).

The most-recent-operating-state list 18 is a list that holds an identification of the most recent operating state (normal or abnormal) of the monitoring-target process, which is acquired by the monitoring agent 15 in the most-recent cycle. The most-recent-operating-state list 18 is held in a file stored in the magnetic disk drive 90g (see FIG. 8) or an area of a main memory 90c (see FIG. 8) which can be referred to by the monitoring agent 15 and is initialized when the monitoring agent 15 is started.

The monitoring server 30 is a server computer that performs integrated monitoring of the monitored servers 10a, 10b, and 10c and is an example of a monitoring apparatus. The monitoring server 30 includes a monitoring control unit 31.

The monitoring control unit 31 connects to the monitoring agent 15 that operates in the monitored server 10 via the network 80 and controls the operation of the monitoring agent 15. More specifically, the monitoring control unit 31 includes a monitoring-instruction receiving section 41 which is an example of an receiving section that receives an instruction to monitor the monitoring-target process 11 (hereinafter referred to as "monitoring instruction") input from the monitoring console 50 and a monitoring-instruction transmitting section 42 as an example of a control unit that transmits the monitoring instruction to the monitoring agent 15. The monitoring control unit 31 further includes a state-transition receiving section 43 which is an example of an acquisition section that receives information indicating that a state transition event has occurred in the monitoring-target process 11 (hereinafter referred to as "state transition information") from the monitoring agent 15 and a state-transition output section 44 which is an example of an output section that outputs the state transition information to the monitoring console 50.

Next, the operation of the monitoring system of the first embodiment will be described in detail.

First, the operation of the process start and stop procedure 12 will be described.

FIG. 2 is a flowchart showing an example of operation when the process start and stop procedure 12 starts the monitoring-target process 11, in accordance with the present invention. This operation is started, for example, when the OS boot procedure 13 gives an instruction to start the monitoring-target process 11 when booting the OS and when the user gives an instruction to start the monitoring-target process 11 at any given time.

When the operation is started, the process start section 21 determines whether the monitoring-target process 11 has already been started (step 101). This determination may be made by checking whether a process corresponding to a process label held in the process start and stop procedure 12 is present in the operating process.

If it is determined that the monitoring-target process 11 has already been started, the process start section 21 notifies the monitoring server 30 of the fact and logs it in the monitored server 10 (step 109), and the process concludes.

On the other hand, if it is determined that the monitoring-target process 11 has not yet been started, the monitoring-condition deleting section 24 searches the monitoring-condition registry 14 using the process label as a key (step 102) and determines whether the monitoring-condition record of the monitoring-target process 11 is registered (i.e., stored in the monitoring-condition registry 14) (step 103). If it is determined that the monitoring-condition record of the monitoring-target process 11 is not registered, the process start and stop procedure 12 moves to step 105. If it is determined that the monitoring-condition record of the monitoring-target process 11 is registered, the monitoring-condition deleting section 24 deletes the record (step 104), and the process start and stop procedure 12 moves to step 105. Such a situation occurs, for example, when an abnormal end occurred at the last starting of the monitoring-target process 11. Information at the last starting is deleted to perform this monitoring normally.

Thereafter, the process start section 21 executes a command to start the monitoring-target process 11 (step 105) and determines whether the starting of the monitoring-target process 11 has succeeded (step 106).

If it is determined that the starting of the monitoring-target process 11 has not succeeded, the process start section 21 notifies the monitoring server 30 of the fact and logs it in the monitored server 10 (step 109), and the process concludes.

On the other hand, if it is determined that the starting of the monitoring-target process 11 has succeeded, the monitoring-condition registering section 23 acquires monitoring conditions pertaining to monitoring-target process 11 (step 107). Of the monitoring conditions, the process label is acquired from the information held in the process start and stop procedure 12, and the process ID and the parent process ID are acquired from the OS. The process user name, the upper limit of the number of process instances, the lower limit of the number of process instances, the operating-state acquisition method, the autorun action, and the notification event specification may be acquired from, for example, information that the user of the monitored server 10 has designated as an argument when starting the process start and stop procedure 12 and information that the user of the monitored server 10 set in advance in association with the monitoring-target process 11. Alternatively, the user of the monitored server 10 may describe them as codes in the process start and stop procedure 12. Thus, the monitoring-condition registering section 23 generates and then registers (i.e., stores) a monitoring-condition record that includes the acquired monitoring conditions in the monitoring-condition registry 14 (step 108). In other words, in this operation example, by not registering the monitoring-condition record in the monitoring-condition registry 14 until the starting of the monitoring-target process 11 is essentially completed, the risk of detecting erroneously that the non-operating state of the monitoring-target process 11 is abnormal before the starting of the monitoring-target process 11 is prevented. The monitoring-condition registering section 23 provides notification to the monitoring server 30 that the monitoring-condition record is registered and logs a message of the registration in the monitored server 10 (step 109), and the process concludes.

In this operation example, the notification and logging of the fact are performed in step 109 in the case where the monitoring-target process 11 has already been started, in the case where the starting of the monitoring-target process 11 has failed, and in the case where the registration of the monitoring-condition record in the monitoring-condition registry 14 has succeeded. Alternatively, the notification and logging may be performed in step 109 in the case where the registration of the monitoring-condition record to the monitoring-condition registry 14 or deletion of the monitoring-condition record from the monitoring-condition registry 14 has failed.

An instruction not to register the monitoring-condition record in the monitoring-condition registry 14 may be made as an option of the starting instruction so that the process can be started without being monitored during testing or the like. In this case, the process start and stop procedure 12 skips the processes in steps 107 and 108.

FIG. 3 is a flowchart showing an example of operation when the process start and stop procedure 12 stops the monitoring-target process 11, in accordance with the present invention. This operation of stopping the monitoring-target process 11 is initiated, for example, when the user gives an instruction to stop the monitoring-target process 11 at any given time.

When the operation is started, the monitoring-condition deleting section 24 searches the monitoring-condition registry 14 using the process label as a key (step 121) and determines whether the monitoring-condition record of the monitoring-target process 11 is registered (step 122). If it is determined that the monitoring-condition record of the monitoring-target process 11 is not registered, the process start and stop procedure 12 moves to step 124. If it is determined that the monitoring-condition record of the monitoring-target process 11 is registered, the monitoring-condition deleting section 24 deletes the record (step 123), and the process start and stop procedure 12 moves to step 124.

Thereafter, the process stop section 22 determines whether the monitoring-target process 11 is in operation (step 124). This determination may be made by checking whether a process corresponding to a process label held in the process start and stop procedure 12 is present in the operating process.

If it is determined that the monitoring-target process 11 is not in operation, the process stop section 22 notifies the monitoring server 30 of it and logs it in the monitored server 10 (step 126) and concludes the process.

On the other hand, if it is determined that the monitoring-target process 11 is in operation, the process stop section 22 executes a command to stop the monitoring-target process 11 (step 125). In other words, in this operation example, by stopping the monitoring-target process 11 after deleting the monitoring-condition record from the monitoring-condition registry 14, the risk of detecting erroneously that the non-operating state of the monitoring-target process 11 is abnormal after the monitoring-target process 11 is stopped is prevented. The process stop section 22 notifies the monitoring server 30 that the monitoring-target process 11 has stopped and logs it in the monitored server 10 (step 126), and the process concludes.

Next, the operation of the monitoring agent 15 will be described.

FIGS. 4 and 5 show a flowchart showing an example of the monitoring agent 15 monitoring the monitoring-target process 11, in accordance with the present invention. The monitoring of the monitoring-target process 11 comprises examining operating states of the monitoring-target process. This monitoring operation is started when the monitoring-instruction receiving section 41 of the monitoring server 30 receives a monitoring instruction from the monitoring console 50, and the monitoring-instruction transmitting section 42 of the monitoring server 30 transmits the monitoring instruction to the monitoring agent 15.

As shown in FIG. 4, upon starting the operation, the monitoring agent 15 first initializes the most-recent-operating-state list 18 (step 141). The initialization of the most-recent-operating-state list 18 may be made in the case where the most-recent-operating-state list 18 is stored as a file in the magnetic disk drive 90g (see FIG. 8) and need not be performed in the case where the most-recent-operating-state list 18 is stored in the main memory 90c (see FIG. 8).

Then, the monitoring agent 15 searches the monitoring-condition registry 14 (step 142) and determines whether an unprocessed monitoring-condition record is present in the monitoring-condition registry 14 (step 143).

As will be described later, it is determined that the entire monitoring-condition record in the monitoring-condition registry 14 has been processed and there is no unprocessed monitoring-condition record, the monitoring agent 15 deletes an unnecessary entry from the most-recent-operating-state list 18 (step 144). Here, the unnecessary entry is, for example, an entry in which a corresponding monitoring-condition record is not present in the monitoring-condition registry 14 in the process described later. When an entry in the most-recent-operating-state list 18 is referred to in step 161 of FIG. 5, a referred flag may be recorded in association with the entry, and an entry in which a referred flag is not recorded may be finally set as an entry in which a corresponding monitoring-condition record is not present in the monitoring-condition registry 14. Thereafter, the monitoring agent 15 stands by for a preset time (step 145) and returns to step 142.

If it is determined in step 143 that an unprocessed monitoring-condition record is present, the monitoring agent 15 determines whether a non-monitoring time period schedule is defined in the monitoring-condition registry 14 and whether the present time is within the non-monitoring time period indicated by the non-monitoring time period schedule (step 146).

If it is determined that the non-monitoring time period schedule is stored in the monitoring condition record in the monitoring-condition registry 14 and that the present time is within the time period indicated by the non-monitoring time period schedule, monitoring based on the monitoring-condition record is not performed, and thus, the monitoring agent 15 skips the following processes and returns to step 143 and processes the following monitoring-condition record.

On the other hand, if it is determined that the non-monitoring time period schedule is not defined or it is determined, even if the non-monitoring time period schedule is defined, the present time is not within the time period indicated by the non-monitoring time period schedule, the monitoring agent 15 determines whether an operating-state acquisition method is defined in the monitoring-condition record (step 147).

If it is determined that an operating-state acquisition method is defined in the monitoring-condition record, the monitoring agent 15 executes the method (step 148) and ascertains the current operating state of the monitoring-target process 11 from the returned value of the method (step 149).

On the other hand, if it is determined that no operating-state acquisition method is defined in the monitoring-condition record, the monitoring agent 15 displays a list of operating processes using a function provided by the OS (a command, such as a PS command, or an API), from which the monitoring agent 15 selects a listed operating process as the monitoring-target process 11 based on the process label (step 150). By verifying that the operational state of the of the listed operating process satisfies conditions defined in the monitoring-condition record, the monitoring agent 15 ascertains the current operating state of the monitoring-target process 11 as being the operational state of the listed operating process (step 151).

Thereafter, as shown in FIG. 5, the monitoring agent 15 refers to an entry corresponding to the monitoring-condition record in the most-recent-operating-state list 18 (step 161).

The monitoring agent 15 compares the current operating state of the monitoring-target process 11 ascertained in step 149 or 151 and the most recent operating state of the monitoring-target process 11 registered in the entry in the most-recent-operating-state list 18 to determine whether the operating states differ, that is, whether an operating state transition has occurred in the operating state of the monitoring-target process (step 162).

If it is determined that state transition has not occurred in the operating state, the following processes are skipped, and the monitoring agent 15 returns to step 143 in FIG. 4 and processes the next monitoring-condition record.

On the other hand, if it is determined that an operating state transition has occurred in the operating state, the monitoring agent 15 determines whether it is an operating state transition from normal to anomaly (i.e., to an abnormal operating state) (step 163).

If it is determined that it is not an operating state transition from normal to abnormal, that is, the abnormal operating state has returned to normal, the monitoring agent 15 moves to step 166.

On the other hand, if it is determined that it is state transition from normal to anomaly, that is, anomaly is detected, the monitoring agent 15 determines whether an autorun action is defined in the monitoring-condition record (step 164). If it is determined that no autorun action is defined, the monitoring agent 15 moves to step 166; if it is determined that an autorun action is defined, the monitoring agent 15 executes the autorun action 17 (step 165) and moves to step 166.

Thereafter, the monitoring agent 15 notifies the state-transition receiving section 43 of the monitoring server 30 of state transition information indicating that an operating state transition has occurred in the monitoring-target process 11 and logs the information in the monitored server 10 (step 166). In the case where event severity, a message text, and so on are defined as the notification event specification in the monitoring-condition record, the notification event specification including the event severity and the message text may be notified. The state transition information may include information indicating that an autorun action has been executed. Thus, in the monitoring server 30, the state-transition receiving section 43 receives state transition information, the state-transition output section 44 outputs the state transition information to the monitoring console 50, and the monitoring console 50 displays the event severity, the message text, and so on included in the state transition information. The monitoring agent 15 replaces the operating state of the monitoring-target process 11 registered in the most-recent-operating-state list 18 with the operating state of the monitoring-target process 11 ascertained in step 149 or 151 of FIG. 4 (step 167) and returns to step 143.

Monitoring condition records to be registered in the monitoring-condition registry 14 will be specifically described.

FIG. 6 is a diagram showing an example of such monitoring-condition records, in accordance with the present invention.

As shown in FIG. 6, the monitoring-condition records include, as monitoring conditions, process label, process name, process user name, upper limit of the number of process instances, lower limit of the number of process instances, operating-state acquisition method, autorun action, notification event specification, and non-monitoring time period schedule. Since the monitoring conditions have already been described, descriptions thereof will be omitted here. Although the monitoring conditions further include process ID and parent process ID, descriptions thereof will also be omitted here.

First, a monitoring-condition record in the first row will be described.

The monitoring-condition record in the first row is a monitoring-condition record in which process label is "RDBMS". It is assumed that this monitoring-condition record is dynamically registered and deleted by the process start and stop procedure 12.

In this monitoring-condition record, since a dedicated command is defined as an operating-state acquisition method, the operating state is acquired in steps 148 and 149 of FIG. 4. Accordingly, determining conditions, such as process name and the number of process instances, used in step 151 of FIG. 4 are not set.

In this monitoring-condition record, since a restart command is defined as an autorun action when anomaly is detected, the monitoring-target process 11 is restarted in step 165 of FIG. 5.

Furthermore, in this monitoring-condition record, since event severity and a message text including an emergency contact address are defined as notification event specifications when anomaly is detected, state transition information including such information is notified in step 166 of FIG. 5.

Next, a monitoring-condition record in the second row will be described.

The monitoring-condition record in the second row is a monitoring-condition record in which process label is "Web-Server". It is also assumed that this monitoring-condition record is dynamically registered and deleted by the process start and stop procedure 12.

In this monitoring-condition record, since no operating-state acquisition method is defined, the operating state is ascertained in steps 150 and 151 of FIG. 4. Accordingly, process name "httpd", upper limit of the number of process instances "100", lower limit of the number of process instances "20" are set as determining conditions. Specifically, if a process named as "httpd" having instances between the upper limit 100 and the lower limit 20 is operating in step 151 of FIG. 4, it is determined to be normal, otherwise it is determined to be abnormal.

In this monitoring-condition record, since email sending is defined as an autorun action when anomaly is detected, email is sent in step 165 of FIG. 5.

Furthermore, since event severity "CRITICAL" and a message text are defined in this monitoring-condition record, state transition information including such information is notified in step 166 of FIG. 5 as a notification event specification when anomaly is detected.

Next, a monitoring-condition record in the third row will be described.

The monitoring-condition record in the third row is a monitoring-condition record in which process label is "APPL". It is assumed that the monitoring-condition record is statistically defined.

Since no operating-state acquisition method is defined in this monitoring-condition record, the operating state is ascertained in steps 150 and 151 of FIG. 4. Accordingly, process name "program_A", process user name "userA", upper limit of the number of process instances "1", and lower limit of the number of process instances "1" are set as determining conditions. Specifically, in step 151 of FIG. 4, if only one process named as "program_A" executed by a user "userA" is operating, it is determined to be normal, otherwise it is determined to be abnormal.

Since an autorun action when anomaly is detected is not defined in this monitoring-condition record, the determination in step 164 of FIG. 5 is No, and thus, step 165 is skipped. Furthermore, since a notification event specification when anomaly is detected is not defined in this monitoring-condition record, state transition information at default setting is notified in step 166 of FIG. 5.

Furthermore, since this monitoring-condition record is statistically defined, "Sunday 22:00-23:00" is defined as a non-monitoring time period schedule. Accordingly, if the present time is between 22:00 and 23:00 on Sunday, the determination in step 146 of FIG. 4 is Yes, and the processes in step 147 to 151 and the processes in FIG. 5 are skipped.

FIG. 7 is a block diagram showing a configuration example of a monitoring system of a second embodiment of the present invention.

As shown in FIG. 7, as in the first embodiment, also the monitoring system of the second embodiment includes the monitored servers 10a, 10b, and 10c and the monitoring server 30 connected via the network 80, and the monitoring server 30 connects to the monitoring console 50. Also in the second embodiment, the monitored servers 10a, 10b, and 10c are referred to as monitored servers 10 when there is no need to differentiate them from one another, and the number of monitored servers 10 is not limited to three.

The monitored servers 10 are server computers to be monitored by the monitoring server 30 and are an example of a monitored apparatus. The monitored servers 10 each include the monitoring-target process 11, the process start and stop procedure 12, the OS boot procedure 13, and the operating-state acquisition method 16.

The monitoring-target process 11 is a process whose operating state is monitored by the monitoring server 30.

The process start and stop procedure 12 is a procedure for controlling the start-up and stop of the monitoring-target process 11. The process start and stop procedure 12 instructs the monitoring server 30 to register a monitoring-condition record including monitoring conditions when starting the monitoring-target process 11 and instructs the monitoring server 30 to delete the monitoring-condition record including the monitoring conditions when stopping the monitoring-target process 11. In other word, by executing the process start and stop procedure 12, the monitored server 10 implements the process start section 21 that starts the monitoring-target process 11, the process stop section 22 that stops the monitoring-target process 11, a monitoring-condition registration instructing section 25 as an example of a registering section that instructs the monitoring server 30 to register a monitoring-condition record and a registration-instruction transmitting section, and a monitoring-condition deletion instructing section 26 as an example of a deleting section that instructs the monitoring server 30 to delete the monitoring-condition record and a deletion-instruction transmitting section.

The OS boot procedure 13 is a procedure for starting the operating system (OS) of the monitored server 10. The OS boot procedure 13 instructs the monitoring server 30 to initialize monitoring-condition records on the monitored server 10 when starting the OS, that is, when the process of starting all the monitoring-target processes 11 is started. However, of the monitoring-condition records, statistically defined monitoring-condition records other than monitoring-condition records that are dynamically registered in response to an instruction from the process start and stop procedure 12 are not initialized. The OS boot procedure 13 sometimes implements the process start and stop procedure 12 when starting the OS.

The operating-state acquisition method 16 is data, such as a command, for use in acquiring a process operating state and is stored in, for example, the magnetic disk drive 90g (see FIG. 8). The reason why an autorun action 37 is held in the monitoring server 30 unlike in the first embodiment, while the operating-state acquisition method 16 is stored in the monitored server 10 as in the first embodiment is that the operating-state acquisition method 16 depends on the monitoring-target process 11. Alternatively, the operating-state acquisition method 16 may be held in the monitoring server 30.

The monitoring server 30 is a server computer that performs integrated monitoring of the monitored servers 10a, 10b, and 10c and is an example of a monitoring apparatus. The monitoring server 30 includes the monitoring control unit 31, a monitoring-condition registry 34, the autorun action 37, and a most-recent-operating-state list 38.

The monitoring control unit 31 controls monitoring of the monitoring-target processes 11 operating in the monitored servers 10. The monitoring control unit 31 updates the monitoring-condition registry 34 in accordance with instructions from the OS boot procedure 13 and the process start and stop procedure 12. More specifically, the monitoring control unit 31 includes a monitoring-instruction receiving section 41 as an example of an receiving section that receives an instruction to monitor the monitoring-target process 11 (hereinafter referred to as a monitoring instruction) input from the monitoring console 50 and a state-transition output section 44 as an example of an output section that outputs information indicating that a state transition event has occurred in the monitoring-target process 11 (state transition information) to the monitoring console 50. The monitoring control unit 31 further includes a monitoring-condition initializing section 45 that initializes monitoring-condition records of the monitored server 10 in the monitoring-condition registry 34 when instructed by the OS boot procedure 13 to initialize the monitoring-condition records, a monitoring-condition registering section 46 as an example of a registering section that registers a monitoring-condition record in the monitoring-condition registry 34 when instructed by the process start and stop procedure 12 to register monitoring conditions, and a monitoring-condition deleting section 47 as an example of a deleting section that deletes a monitoring-condition record when instructed by the process start and stop procedure 12 to delete monitoring conditions from the monitoring-condition registry 34. The monitoring control unit 31 further includes a remote monitoring section 48 as an example of a monitoring section that monitors the monitoring-target process 11, similarly to the monitoring agent 15 of the first embodiment, remotely.

The monitoring-condition registry 34 is a file or a database stored in a data storage device in the monitored computer 10 and is an example of a storage section that stores monitoring-condition records. The monitoring-condition records include monitoring conditions which are examples of monitoring setting information, such as server name, a process label, a process name, a process user name, a process ID, a parent process ID, an upper limit of the number of process instances, a lower limit of the number of process instances, an operating-state acquisition method, an autorun action, a notification event specification, and a non-monitoring time period schedule. In other words, since the monitoring-condition registry 34 includes monitoring-condition records on the monitored servers 10a, 10b, and 10c, the monitoring conditions includes server name in addition to the information described in the first embodiment. Since the monitoring conditions other than the server name have been described in the first embodiment, descriptions thereof will be omitted here.

The autorun action 37 is data, such as commands for rebooting the process and providing a fault notification by email, and is stored in, for example, the magnetic disk drive 90g (see FIG. 8).

The most-recent-operating-state list 38 is a list that holds the state (normal or abnormal) of the monitoring-target process, which is acquired in the most-recent cycle by the remote monitoring section 48 of the monitoring control unit 31. The most-recent-operating-state list 38 is held in a file stored in the magnetic disk drive 90g (see FIG. 8) or an area of the main memory 90c (see FIG. 8) which can be referred to by the remote monitoring section 48 and is initialized when the remote monitoring section 48 is started.

In summary, the main differences between the monitoring system of the first embodiment and the monitoring system of the second embodiment are as follows.

Firstly, although the first embodiment is configured such that the monitoring agent 15 is operating on each monitored server 10, the second embodiment does not need to operate the monitoring agent 15 on the monitored server 10 and also accommodates a method of remotely monitoring the monitoring-target process 11 from the monitoring server 30 (an agentless monitoring system).

Secondly, although the first embodiment is configured such that the monitoring-condition registry 14 and the most-recent-operating-state list 18 are managed on each of the monitored servers 10 in a distributed manner, and descriptions related only to the monitored servers 10 are managed, the second embodiment is configured such that the monitoring-condition registry 34 and the most-recent-operating-state list 38 are controlled on the monitoring server 30 in a centralized manner, and descriptions thereof relate to the plurality of monitored servers 10.

Thirdly, although the first embodiment is configured such that the monitoring-condition registry 14 and the most-recent-operating-state list 18 are updated on each monitored server 10, the second embodiment is configured such that the monitoring-condition registry 34 and the most-recent-operating-state list 38 are updated in a unified way on the monitoring server 30 using an event notification from the monitored server 10 as a trigger. Here, the event notification serving as a trigger is provided from the OS boot procedure 13 and the process start and stop procedure 12. Preferably, the monitored server 10 has an arrival confirming function and a resending function because it provides the event notification via the network 80.

Next, the operation of the monitoring system of the second embodiment will be described in detail.

First, the operation of the process start and stop procedure 12 will be described.

An operation when the process start and stop procedure 12 starts the monitoring-target process 11 is substantially the same as that shown in the flowchart of FIG. 2. However, in the second embodiment, since the monitoring-condition registry 34 is present on the monitoring server 30, the process start and stop procedure 12 accesses the monitoring-condition registry 34 via the network 80.

Specifically, in steps 102 and 103 of FIG. 2, the monitoring-condition deletion instructing section 26 of the monitored server 10 issues an instruction to search the monitoring-condition registry 34 using a process label as a key and determine whether the monitoring-condition record of the monitoring-target process 11 is registered. The monitoring-condition deleting section 47 of the monitoring server 30 searches the monitoring-condition registry 34 using the process label as a key and determines whether the monitoring-condition record of the monitoring-target process 11 is registered in the monitoring-condition registry 34.

In step 104 of FIG. 2, the monitoring-condition deletion instructing section 26 of the monitored server 10 issues an instruction to delete the monitoring-condition record of the monitoring-target process 11 from the monitoring-condition registry 34, and the monitoring-condition deleting section 47 of the monitoring server 30 deletes the monitoring-condition record of the monitoring-target process 11 from the monitoring-condition registry 34.

Furthermore, in step 108 of FIG. 2, the monitoring-condition registration instructing section 25 of the monitored server 10 issues an instruction to register monitoring-condition records including monitoring conditions into the monitoring-condition registry 34, and the monitoring-condition registering section 46 of the monitoring server 30 registers the monitoring-condition records including monitoring conditions into the monitoring-condition registry 34.

An operation when the process start and stop procedure 12 stops the monitoring-target process 11 is substantially the same as that shown in the flowchart of FIG. 3. However, in the second embodiment, since the monitoring-condition registry 34 is present on the monitoring server 30, the process start and stop procedure 12 accesses the monitoring-condition registry 34 via the network 80.

Specifically, in steps 121 and 122 of FIG. 3, the monitoring-condition deletion instructing section 26 of the monitored server 10 issues an instruction to search the monitoring-condition registry 34 using a process label as a key to determine whether the monitoring-condition records of the monitoring-target process 11 are registered. The monitoring-condition deleting section 47 of the monitoring server 30 searches the monitoring-condition registry 34 using a process label as a key to determine whether the monitoring-condition records of the monitoring-target process 11 are registered in the monitoring-condition registry 34.

In step 123 of FIG. 3, the monitoring-condition deletion instructing section 26 of the monitored server 10 issues an instruction to delete the monitoring-condition records of the monitoring-target process 11 from the monitoring-condition registry 34, and the monitoring-condition deleting section 47 of the monitoring server 30 deletes the monitoring-condition record of the monitoring-target process 11 from the monitoring-condition registry 34.

Next, the operation of the remote monitoring section 48 of the monitoring server 30 will be described.

Although the operation of the remote monitoring section 48 of the monitoring server 30 is substantially the same as that of the monitoring agent 15 shown in the flowchart in FIGS. 4 and 5, the second embodiment is configured such that registration and deletion of the monitoring-condition record is performed at the monitoring server 30 side, and monitoring of the monitoring-target process 11 and calling of the operating-state acquisition method 16 used at that time are performed via the network 80.

Specifically, in steps 141 to 144, 146, and 147, the remote monitoring section 48 refers to and updates the monitoring-condition registry 34 or the most-recent-operating-state list 38 in the monitoring server 30.

In step 148 of FIG. 4, the remote monitoring section 48 calls the operating-state acquisition method 16 from the monitored server 10 and executes it.

Furthermore, in step 150 of FIG. 4, the remote monitoring section 48 acquires information on processes operating on the monitored servers 10 via the network 80 using a function provided by the OS and displays a list thereof, from which the monitoring-target process 11 is selected on the basis of the process label.

In steps 161 to 165 and 167 of FIG. 5, the remote monitoring section 48 refers to and updates the monitoring-condition registry 34, the autorun action 37, or the most-recent-operating-state list 38 in the monitoring server 30.

Furthermore, in step 166 of FIG. 5, the remote monitoring section 48 notifies the state-transition output section 44 of the monitoring server 30 of state transition information indicating that a state transition event for the monitoring-target process 11 has occurred and logs the information in the monitoring server 30. Thus, the state-transition output section 44 outputs the state transition information to the monitoring console 50, and the monitoring console 50 displays event severity, a message text, and so on included in the state transition information.

As described above, the foregoing embodiments adopt a configuration in which the monitoring-target process 11 registers monitoring conditions (process name, process user name, upper limit of the number of process instances, lower limit of the number of process instances, operating-state acquisition method, autorun action, notification event specification and so on) for itself with a predetermined interface, and the monitoring agent 15 or the like automatically executes monitoring based on the registered monitoring conditions at any time.

This configuration provides the following advantages.

Firstly, there is no need to check, sum up, document, set, and manage the individual monitoring-target processes 11 of the monitored servers 10 and the monitoring conditions thereof in advance at the monitoring server 30 side as in the related art.

Secondly, even if the monitoring conditions of processes that constitute a service change during an implementation phase thereof, there is no need to perform connection and coordination between a person in charge of the monitoring server 30 and a person in charge of the monitored server 10.

Thirdly, the monitoring-target process 11 side is allowed to freely designate and define an optimum operating-state acquisition method, autorun action, and notification event specification for individual processes and to change them at any timing without influencing the settings of the monitoring server 30 side.

The embodiments also provide the following advantages:

The monitoring system can easily be installed in a known, general distributed monitoring system configuration (manager agent configuration).

The monitoring system has no restriction and request in implementation for the monitoring-target process 11 itself, thus providing high general versatility.

Since there is no need to change the monitoring-target process 11 itself provided that the process start and stop procedure 12 can be corrected, the present service is not influenced, and transition is easy.

The monitoring system is particularly advantageous as a monitoring solution in an environment in which frequent changes are made, such as a cloud environment, in which dynamic provisioning is frequently performed and a virtualized server environment.

The monitoring system eliminates the need for the operation, at a monitoring server side, of registering monitoring conditions for a monitoring-target process executed by a monitored server. At each of monitored servers 10a, 10b, and 10c, a process start and stop procedure 12 registers monitoring conditions in a monitoring-condition registry 14 after starting a monitoring-target process 11 and deletes the monitoring conditions from the monitoring-condition registry 14 after stopping the monitoring-target process 11. A monitoring agent 15 monitors the monitoring-target process 11 using an operating-state acquisition method 16 if present in the monitoring conditions in the monitoring-condition registry 14. If the state shifts from a state in a most-recent-operating-state list 18, the monitoring agent 15 executes an autorun action 17 if present in the monitoring conditions in the monitoring-condition registry 14 and notifies a monitoring server 30 of state transition information. Then, a monitoring control unit 31 in the monitoring server 30 outputs the state transition information to a monitoring console 50.

Finally, a computer hardware configuration suitable for the embodiments will be described. FIG. 8 is a diagram showing an example of such a computer hardware configuration, in accordance with the present invention. As shown in FIG. 8, the computer includes a central processing unit (CPU) 90*a* serving as computing means, a main memory 90*c* connected to the CPU 90*a* via a mother board (M/B) chip set 90*b*, and a display mechanism 90*d* which is similarly connected to the CPU 90*a* via the M/B chip set 90*b*. The M/B chip set 90*b* connects to a network interface 90*f*, the magnetic disk drive (HDD) 90*g*, an audio mechanism 90*h*, a keyboard/mouse 90*i*, and a flexible disk drive 90*j* via a bridge circuit 90*e*.

In FIG. 8, the individual components are connected together via buses. For example, the CPU 90*a* and the M/B chip set 90*b*, and the M/B chip set 90*b* and the main memory 90*c* are connected via a CPU bus. The M/B chip set 90*b* and the display mechanism 90*d* may be connected via an accelerated graphics port (AGP), but if the display mechanism 90*d* includes a PCI Express-ready video card, the M/B chip set 90*b* and the video card are connected via a PCI Express (PCIe) bus. For connection between the bridge circuit 90*e* and the network interface 90*f*, for example, PCI Express can be used. For connection with the magnetic disk drive 90*g*, for example, serial AT attachment (ATA), parallel transfer ATA, or peripheral components interconnect (PCI) may be used. Furthermore, for connection with the keyboard/mouse 90*i* and the flexible disk drive 90*j*, a universal serial bus (USB) can be used.

The present invention may be achieved entirely by hardware or software or by both of hardware and software. The present invention can be achieved as a computer, a data processing system, and a computer program comprising program code stored on a computer readable hardware storage medium or device and configured to be executed by the computer to perform the methods of the present invention. Examples of the hardware storage medium or device include an electronic, magnetic, optical, electromagnetic, infrared, and semiconductor system (apparatus or unit or device). The hardware storage medium or device is a physically tangible storage medium or device. Examples of the computer-readable hardware storage medium or device includes a semiconductor, solid-state storage unit, a magnetic tape, a removable computer diskette, a random access memory (RAM), a read-only memory (ROM), a rigid magnetic disk, and an optical disk. Examples of the optical disk at the present time include a compact disk read-only memory (CD-ROM), a compact disk read/write (CD-R/W), and a DVD.

The present invention may be achieved by the monitoring system of FIG. 1. The monitoring system comprises the monitored server computer 10 and a hardware storage medium or device that is a physically tangible storage medium or device. The storage medium or device stores program code configured to be executed by the monitored server computer to implement the methods of the present invention, which include a method for monitoring a monitoring-target process.

While the present invention has been described in its preferred embodiments, it is to be understood that the technical scope of the present invention is not limited to the embodiments. It is apparent to those skilled in the art that various changes and modifications can be made without departing from the spirit and scope of the present invention.

What is claimed is:

1. A method for monitoring a monitoring-target process, said method comprising:

a monitored server computer starting a monitoring-target process;

after said starting the monitoring-target process, said computer ascertaining a current operating state of the monitoring-target process, said ascertaining comprising utilizing a monitoring condition record included in a monitoring-condition registry, said monitoring-condition registry being a file or database stored in a data storage device in the computer, said monitoring condition record including monitoring conditions controlling implementation of the monitoring-target process, said monitoring condition record comprising a process label that uniquely identifies the monitoring-target process; and after said ascertaining the current operating state, said computer stopping the monitoring-target process, wherein said starting the monitoring-target process comprises:

said computer determining the monitoring conditions controlling implementation of the monitoring-target process;

after said determining the monitoring conditions, said computer generating the monitoring condition record that includes the monitoring conditions;

after said generating the monitoring condition record, said computer storing the monitoring condition record in the monitoring-condition registry;

after said storing the monitoring condition record, said computer notifying a monitoring server external to the monitored server computer that the monitoring condition record has been stored in the monitoring-condition registry, said monitoring server being another server computer; and after said storing the monitoring condition record, said computer logging in the computer a message stating that the monitoring condition record has been stored in the monitoring-condition registry;

wherein said starting the monitoring-target process further comprises:

before said determining the monitoring conditions, said computer searching the monitoring-condition registry for the monitoring condition record, said searching comprising using the process label as a search key for said searching;

said computer determining from said searching that the monitoring condition record is stored in the monitoring-condition registry; and in response to said determining from said searching that the monitoring condition record is stored in the monitoring-condition registry, said computer deleting the monitoring condition record from the monitoring-condition registry.

2. The method of claim 1, said method further comprising:

after said starting the monitoring-target process and before said ascertaining the current operating state, said computer determining that a current time is not within a non-monitoring time period specified a non-monitoring time period schedule stored in the monitoring condition record, said non-monitoring time period denoting an interval of time during which the monitoring-target process is not permitted to be monitored.

3. The method of claim 1, wherein said ascertaining the current operating state comprises:

said computer determining that the monitoring condition record specifies an operating-state acquisition method stored in the computer, wherein a returned value resulting from execution of the operating-state acquisition method is the current operating state;

in response to said determining that the monitoring condition record specifies the operating-state acquisition method, said computer executing the operating-state acquisition method; and said computer ascertaining the current operating state as the returned value resulting said executing the operating-state acquisition method.

4. The method of claim 1, wherein said ascertaining the current operating state comprises:

said computer determining that the monitoring condition record does not specify an operating-state acquisition method stored in the computer, wherein a returned value resulting from execution of the operating-state acquisition method is the current operating state;

in response to said determining that the monitoring condition record does not specify the operating-state acquisition method, said computer selecting a listed operating process from a list of operating process, said selecting the listed operating process being based on the process label comprised by the monitoring condition record, said listed operating process having an operational state; and said computer determining that the operational state of the listed operating process satisfies the monitoring conditions included in the monitoring condition record; and in response to said determining that the operational state of the listed operating process satisfies the conditions included in the monitoring condition record, said computer ascertaining the current operating state as being the operational state of the listed operating process.

5. The method of claim 1, said method further comprising:

after said ascertaining the current operating state and before said stopping the monitoring-target process, said computer determining that the current operating state has changed from a most recent operating state in a most recent cycle of the monitoring-target process;

said computer determining that an operating state transition of the operating state of the monitoring-target process has occurred due to the most recent operating state being a normal operating state and the current operating state being an abnormal operating state;

after said determining that the operating state transition of the operating state of the monitoring-target process has occurred, said computer notifying a monitoring server external to the monitored server computer that said operating state transition has occurred, said monitoring server being another server computer; and after said determining that the operating state transition of the operating state of the monitoring-target process has occurred, said computer logging in the computer a message stating that said operating state transition has occurred.

6. The method of claim 5, wherein the computer stores a most-recent-operating-state list that includes an entry denoting the most recent operating state in the most recent cycle of the monitoring-target process;

wherein said determining that the current operating state has changed comprises comparing the current operating state with the most recent operating state in the most recent cycle of the monitoring-target process denoted in said entry in the most-recent-operating-state list; and wherein the method further comprises: after said determining that the operating state transition of the operating state of the monitoring-target process has occurred, said computer replacing the most recent operating state with the current operating state in the most-recent-operating-state list.

7. The method of claim 5, wherein the monitoring condition record identifies an autorun procedure configured to be executed in response to a determination that a change in the operating state of the monitoring-target process has occurred, and wherein the method further comprises:

in response to said determining that the operating state transition has occurred, said computer executing the autorun procedure.

8. The method of claim 1, said stopping the monitoring-target process comprising:

said computer deleting the monitoring-condition record from the monitoring-condition registry;

said computer determining that the monitoring-target process is in operation;

in response to said determining that the monitoring-target process is in operation, said computer stopping the monitoring-target process; and after said stopping the monitoring-target process, said computer notifying a monitoring server external to the monitored server computer that the monitoring-target process has been stopped, said monitoring server being another server computer.

9. The method of claim 1, wherein the monitoring condition record comprises the process label and at least three different parameters, each different parameter selected from the group consisting of:

a process name which is a name identifying an operating program that is actually operating while the monitoring-target process is being implemented, a process user name which is a name of a user who triggers execution of the operating program identified by the process name, a maximum number of process instances of the monitoring-target process that can be executed simultaneously, a minimum number of process instances of the monitoring-target process that can be executed simultaneously, a specification of an operating state acquisition method stored in the computer such that a returned value resulting from execution of the operating-state acquisition method is the current operating state, an identification of an autorun procedure configured to be executed in response to a determination that a change in an operating state of the monitoring-target process has occurred;

a notification event specification which specifies a severity of an abnormal operating state of the monitoring-target process, and a non-monitoring time period schedule comprising a non-monitoring time period denoting an interval of time during which the monitoring-target process is not permitted to be monitored.

10. A computer program product comprising a computer readable hardware storage device storing program code configured to be executed by a monitored server computer to implement a method for monitoring a monitoring-target process, said method comprising:

said computer starting a monitoring-target process;

after said starting the monitoring-target process, said computer ascertaining a current operating state of the monitoring-target process, said ascertaining comprising utilizing a monitoring condition record included in a monitoring-condition registry, said monitoring-condition registry being a file or database stored in a data storage device in the computer, said monitoring condition record including monitoring conditions controlling implementation of the monitoring-target process, said monitoring condition record comprising a process label that uniquely identifies the monitoring-target process; and after said ascertaining the current operating state, said computer stopping the monitoring-target process, wherein said starting the monitoring-target process comprises:
  said computer determining the monitoring conditions controlling implementation of the monitoring-target process;
  after said determining the monitoring conditions, said computer generating the monitoring condition record that includes the monitoring conditions;
  after said generating the monitoring condition record, said computer storing the monitoring condition record in the monitoring-condition registry;
  after said storing the monitoring condition record, said computer notifying a monitoring server external to the monitored server computer that the monitoring condition record has been stored in the monitoring-condition registry, said monitoring server being another server computer; and
  after said storing the monitoring condition record, said computer logging in the computer a message stating that the monitoring condition record has been stored in the monitoring-condition registry;

wherein said starting the monitoring-target process further comprises:
  before said determining the monitoring conditions, said computer searching the monitoring-condition registry for the monitoring condition record, said searching comprising using the process label as a search key for said searching;
  said computer determining from said searching that the monitoring condition record is stored in the monitoring-condition registry; and
  in response to said determining from said searching that the monitoring condition record is stored in the monitoring-condition registry, said computer deleting the monitoring condition record from the monitoring-condition registry.

11. The computer program product of claim 10, wherein said ascertaining the current operating state comprises:
  said computer determining that the monitoring condition record specifies an operating-state acquisition method stored in the computer, wherein a returned value resulting from execution of the operating-state acquisition method is the current operating state;
  in response to said determining that the monitoring condition record specifies the operating-state acquisition method, said computer executing the operating-state acquisition method; and
  said computer ascertaining the current operating state as the returned value resulting said executing the operating-state acquisition method.

12. The computer program product of claim 10, wherein said ascertaining the current operating state comprises:
  said computer determining that the monitoring condition record does not specify an operating-state acquisition method stored in the computer, wherein a returned value resulting from execution of the operating-state acquisition method is the current operating state;
  in response to said determining that the monitoring condition record does not specify the operating-state acquisition method, said computer selecting a listed operating process from a list of operating process, said selecting the listed operating process being based on the process label comprised by the monitoring condition record, said listed operating process having an operational state; and
  said computer determining that the operational state of the listed operating process satisfies the monitoring conditions included in the monitoring condition record; and
  in response to said determining that the operational state of the listed operating process satisfies the conditions included in the monitoring condition record, said computer ascertaining the current operating state as being the operational state of the listed operating process.

13. The computer program product of claim 10, said method further comprising:
  after said ascertaining the current operating state and before said stopping the monitoring-target process, said computer determining that the current operating state has changed from a most recent operating state in a most recent cycle of the monitoring-target process;
  said computer determining that an operating state transition of the operating state of the monitoring-target process has occurred due to the most recent operating state being a normal operating state and the current operating state being an abnormal operating state;
  after said determining that the operating state transition of the operating state of the monitoring-target process has occurred, said computer notifying a monitoring server external to the monitored server computer that said operating state transition has occurred, said monitoring server being another server computer; and
  after said determining that the operating state transition of the operating state of the monitoring-target process has occurred, said computer logging in the computer a message stating that said operating state transition has occurred.

14. The computer program product of claim 13,
  wherein the computer stores a most-recent-operating-state list that includes an entry denoting the most recent operating state in the most recent cycle of the monitoring-target process;
  wherein said determining that the current operating state has changed comprises comparing the current operating state with the most recent operating state in the most recent cycle of the monitoring-target process denoted in said entry in the most-recent-operating-state list; and
  wherein the method further comprises: after said determining that the operating state transition of the operating state of the monitoring-target process has occurred, said computer replacing the most recent operating state with the current operating state in the most-recent-operating-state list.

15. A system comprising a monitored server computer and a computer readable hardware storage device, said storage device stores program code configured to be executed by the computer to implement a method for monitoring a monitoring-target process, said method comprising:
  said computer starting a monitoring-target process;
  after said starting the monitoring-target process, said computer ascertaining a current operating state of the monitoring-target process, said ascertaining comprising utilizing a monitoring condition record included in a monitoring-condition registry, said monitoring-condition registry being a file or database stored in a data storage device in the computer, said monitoring condition record including monitoring conditions controlling implementation of the monitoring-target process, said monitoring condition record comprising a process label that uniquely identifies the monitoring-target process; and after said ascertaining the current operating state, said computer stopping the monitoring-target process, wherein said starting the monitoring-target process comprises:

said computer determining the monitoring conditions controlling implementation of the monitoring-target process;

after said determining the monitoring conditions, said computer generating the monitoring condition record that includes the monitoring conditions;

after said generating the monitoring condition record, said computer storing the monitoring condition record in the monitoring-condition registry;

after said storing the monitoring condition record, said computer notifying a monitoring server external to the monitored server computer that the monitoring condition record has been stored in the monitoring-condition registry, said monitoring server being another server computer; and after said storing the monitoring condition record, said computer logging in the computer a message stating that the monitoring condition record has been stored in the monitoring-condition registry;

wherein said starting the monitoring-target process further comprises:

before said determining the monitoring conditions, said computer searching the monitoring-condition registry for the monitoring condition record, said searching comprising using the process label as a search key for said searching;

said computer determining from said searching that the monitoring condition record is stored in the monitoring-condition registry; and in response to said determining from said searching that the monitoring condition record is stored in the monitoring-condition registry, said computer deleting the monitoring condition record from the monitoring-condition registry.

16. The system of claim 15, said method further comprising:

after said ascertaining the current operating state and before said stopping the monitoring-target process, said computer determining that the current operating state has changed from a most recent operating state in a most recent cycle of the monitoring-target process;

said computer determining that an operating state transition of the operating state of the monitoring-target process has occurred due to the most recent operating state being a normal operating state and the current operating state being an abnormal operating state;

after said determining that the operating state transition of the operating state of the monitoring-target process has occurred, said computer notifying a monitoring server external to the monitored server computer that said operating state transition has occurred, said monitoring server being another server computer; and after said determining that the operating state transition of the operating state of the monitoring-target process has occurred, said computer logging in the computer a message stating that said operating state transition has occurred.

17. The system of claim 16, wherein the computer stores a most-recent-operating-state list that includes an entry denoting the most recent operating state in the most recent cycle of the monitoring-target process;

wherein said determining that the current operating state has changed comprises comparing the current operating state with the most recent operating state in the most recent cycle of the monitoring-target process denoted in said entry in the most-recent-operating-state list; and wherein the method further comprises: after said determining that the operating state transition of the operating state of the monitoring-target process has occurred, said computer replacing the most recent operating state with the current operating state in the most-recent-operating-state list.

18. The system of claim 16, wherein the monitoring condition record identifies an autorun procedure configured to be executed in response to a determination that a change in the operating state of the monitoring-target process has occurred, and wherein the method further comprises:

in response to said determining that the operating state transition has occurred, said computer executing the autorun procedure.

\* \* \* \* \*